United States Patent
Bonjour et al.

(10) Patent No.: US 6,977,902 B2
(45) Date of Patent: Dec. 20, 2005

(54) PROCESS FOR TESTING A SWITCHING SYSTEM, AND INSERTION DEVICE USEABLE IN THIS PROCESS

(75) Inventors: Dominique Bonjour, Lannion (FR); Thierry Houdoin, Pleumeur Bodou (FR); Emile Stephan, Pleumeur Bodou (FR)

(73) Assignee: France Telecom, Paris (FR)

( * ) Notice: Subject to any disclaimer, the term of this patent is extended or adjusted under 35 U.S.C. 154(b) by 892 days.

(21) Appl. No.: 09/838,466

(22) Filed: Apr. 19, 2001

(65) Prior Publication Data
US 2002/0021672 A1    Feb. 21, 2002

(30) Foreign Application Priority Data
Apr. 19, 2000  (FR)  ................................ 00 05038

(51) Int. Cl.⁷ ............................................. H04J 1/16
(52) U.S. Cl. ...................... 370/250; 370/535; 370/244; 714/25
(58) Field of Search ................ 370/248, 250, 370/535, 395.1, 351, 236.2, 241.1, 395.21, 370/229, 247, 242, 244, 241; 379/58.17, 379/22; 709/224, 223; 706/47; 710/105; 714/25

(56) References Cited

U.S. PATENT DOCUMENTS

| | | | |
|---|---|---|---|
| 5,313,453 A | 5/1994 | Uchida et al. ............ | 370/248 |
| 5,383,177 A | 1/1995 | Tateishi ................... | 370/250 |
| 5,937,165 A | 8/1999 | Schwaller et al. ........ | 709/224 |
| 6,477,595 B1 * | 11/2002 | Cohen et al. ............. | 710/105 |
| 6,598,034 B1 * | 7/2003 | Kloth ...................... | 706/47 |
| 6,611,522 B1 * | 8/2003 | Zheng et al. ............. | 370/395.21 |

FOREIGN PATENT DOCUMENTS

EP        0 511 671        11/1992

OTHER PUBLICATIONS

Search Report issued by the French Patent Office for parent French Application No. 00 05038 filed on Apr. 19, 2000; report dated Jan. 23, 2001.

* cited by examiner

*Primary Examiner*—John Pezzlo
(74) *Attorney, Agent, or Firm*—Gardner Carton & Douglas LLP

(57) ABSTRACT

The switching system receives, originating from an external network facility, data units according to a point-to-point transmission interface format, transporting packets of a higher layer protocol. The data units originating from the external network facility are processed so as to recover first packets. Test traffic carried by second packets of the higher layer protocol is generated, and the first and second packets are multiplexed. The stream of multiplexed packets is converted into data units of the point-to-point transmission interface format, which are re-transmitted to the switching system.

12 Claims, 1 Drawing Sheet

PROCESS FOR TESTING A SWITCHING SYSTEM, AND INSERTION DEVICE USEABLE IN THIS PROCESS

TECHNICAL FIELD

The present invention relates to telecommunication networks using packet data transmission.

BACKGROUND OF THE INVENTION

A main, although non-exclusive, field of application is that of the testing and metrology which are performed on the facilities constituting such networks, both in the laboratory and under operational conditions.

An exemplary application, illustrated by FIG. 1, is that of the testing of network facilities (for example routers, switches or multiplexers). A system under test (SET), composed of one or more switching facilities, is connected to a test facility referred to here as a traffic source (SDT). The SDT injects traffic (data and control) to the SET through an interface J1, and observes the traffic relayed by the SET to the interface J2.

Increasing numbers of protocols used in packet communication networks, in particular networks of the IP ("Internet Protocol") or ATM ("Asynchronous Transfer Mode") type, require, in order to be tested, consistency between the information provided in the control plane, in other words the states established in the SET, and the content of the test traffic injected to the SET. These protocols may be for example LDP ("Label Distribution Protocol"), TDP ("Tag Distribution Protocol"), RSVP ("Resource reSerVation Protocol"), PIM ("Protocol Independent Multicast"), IGMP ("Internet Group Membership Protocol"), PNNI "Private Network-to-Network Interface"), etc.

In a natural solution which enables this consistency to be ensured, these protocols must be installed in the test facilities playing the role of SDT. This poses several difficulties:
- the need to be assured of the interoperability between the installation of the protocol in the SET and in the SDT;
- the impossibility of testing SETs using proprietary protocols, that is to say those whose specifications are therefore not accessible to the SDT manufacturers;
- the rising cost of the test facilities due to the expansive software developments required to install the control protocols;
- the development time required to install these control protocols in the SDT.

One possible way to sidestep the problem set forth hereinabove is illustrated by FIG. 2. It consists in multiplexing towards the SET two traffic streams on the same interface I1:
- the test traffic emanating from the SDT;
- data and information emanating from a network facility denoted C1, situated upstream of the SET. It is then the latter which has the role of creating the states in the SET through the control protocols.

Moreover, if the facility C1 and the SET emanate from the same manufacturer, the problems of interoperability between the various installations of the protocols disappear.

It is easy to insert traffic on an in-service interface of a switching facility when this interface supports a link layer protocol designed to resolve collisions, this being the case with interfaces of the LAN ("Local Area Network") type, for example Ethernet 10 or 100 Mbit/s. In the case of a 1 Gbit/s Ethernet interface, it becomes vital to insert a switch for the frames of the link layer.

Increasing bit rates and advances in techniques mean that the interfaces used in the network cores are of the "point-to-point" type, that is to say they include no multiplexing in a Medium Access Control (MAC) layer. Such is the case for ATM, POS, ("Packet over Sonet") or IP over WDM ("Wavelength Division Multiplexing") interfaces. The packets are delimited by link layer protocols specific to each interface standard (ATM, POS, etc.). These interfaces do not enable packets to be inserted directly onto the physical medium according to the configuration presented in FIG. 2 (insertion of the stream originating from the SDT onto the interface I1). Consequently, the sidestep alluded to hereinabove is not possible, and one comes back to the initial solution (installing of the control protocols in the SDT) with the drawbacks mentioned.

SUMMARY OF THE INVENTION

An aim of the invention is to propose a solution to the problem of inserting packets onto a transmission link of the point-to-point type, which solution should preferably be simple and of low cost.

The invention thus proposes a process for testing a switching system receiving data units according to a point-to-point transmission interface format originating from an external network facility, the data units transporting packets of a higher layer protocol. According to this process, first data units originating from the external network facility are processed so as to recover first packets transported by the first data units, test traffic carried by second packets of the said higher layer protocol is generated, the first and second packets are multiplexed so as to form a stream of multiplexed packets, the stream of multiplexed packets is converted into second data units according to the said point-to-point transmission interface format, and the second data units are transmitted to the switching system.

The data units are processed between the system under test and the external facility by means of standard interface modules available at low cost. The multiplexing is performed at the level of the packets of the higher layer protocol, thus avoiding the problems of delimiting the information elements. This protocol is typically of network layer (layer 3 of the ISO model), for example an IP protocol ("Internet Protocol", Request for Comments 791, published by the Internet Engineering Task Force, September 1981).

The test traffic can be inserted directly from packets generated by the traffic source if the packet multiplexer and the traffic source belong to the same unit. In another embodiment, the traffic source is a unit separate from the insertion device. The generation of the test traffic then comprises the production of a stream of data units according to a specified interface format, transporting the said second packets, and a processing of the said stream of data units so as to recover the second packets.

The external network facility advantageously serves as intermediary for controlling states of the switching system under test. This sidesteps the problem posed by certain signalling protocols, especially those used in MPLS ("Multi-Protocol Label Switching") architectures or multicast architectures, which do not allow the direct creation of the switching states in the system under test. The process makes it possible to obtain test states under good conditions of cost, timescales and productivity, without depending on the details of construction of the test tools.

Another aspect of the present invention relates to a device for inserting traffic comprising first and second interface modules supporting a point-to-point transmission interface format for transferring data units transporting packets of a higher layer protocol, the first interface module being provided so as to receive first data units originating from a network facility and the second interface module being provided so as to send second data units to a switching system. The device furthermore comprises multiplexing means for forming a stream of multiplexed packets comprising first packets recovered by the first interface module from the first data units and second packets of the said higher layer protocol carrying additional traffic. The second data units are produced by the second interface module on the basis of the stream of multiplexed packets.

The possible uses of this device extend beyond the previously mentioned testing context, and generally cover all the requirements pertaining to the insertion of traffic onto a point-to-point data transmission link.

The device can comprise a third interface module receiving a stream of data units according to a specified interface format originating from an external traffic source and recovering the said second packets from the said stream of data units. This interface format, adapted to the type of traffic source used, is a priori independent of the aforesaid point-to-point transmission interface format.

As a variant, the device can be incorporated into the traffic source generating the second packets.

BRIEF DESCRIPTION OF THE DRAWINGS

Other features and advantages of the current invention will become apparent in the following description of non-limiting exemplary embodiments, with reference to the appended drawings, in which.

DETAILED DESCRIPTION OF THE INVENTION

Figure 1:
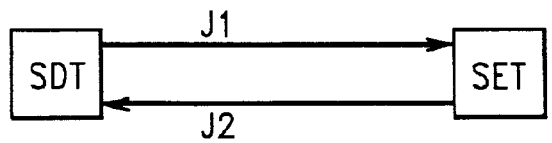
FIGS. 1 and 2, previously discussed, are schematic diagrams of configurations for testing network facilities.
Figure 2:
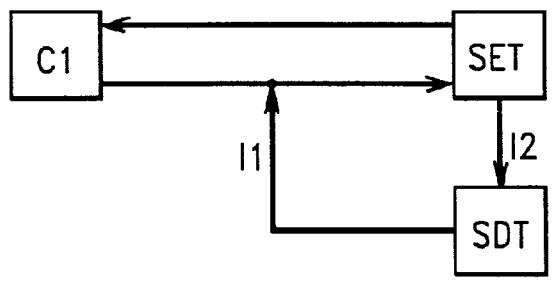
Figure 3:
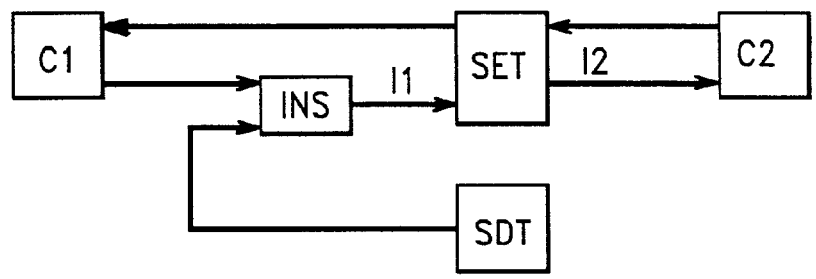
FIG. 3 is a schematic diagram of a network facilities testing configuration adapted to the implementation of the process according to the invention.

With reference to FIG. 3, a system under test (SET), composed of one or more network facilities, is connected to other switching facilities C1, C2 by respective interfaces I1, I2. These interfaces I1, I2 are of the point-to-point type. Control protocols which are well known to the person skilled in the art (unicast routing, multicast routing, MPLS, signalling, RSVP, etc.), supported by the links between C1, C2 and the SET, establish states in the SET which enable it to relay the packets from I1 to I2 and vice versa correctly. An insertion device INS according to the invention is connected to C1, SET and SDT, as indicated in FIG. 3.

This device INS carries out the transparent insertion (that is to say insertion without disturbing the operation of C1 and of the SET) onto an interface I1, of traffic emanating from the external traffic source (SDT). This traffic may have any bit rate and any content. It is composed of data units in accordance with a point-to-point interface format N which is standardized with regard to the physical layer and the delimiting of the packets (layers 1 and 2 of the ISO model), for example ATM or POS. This traffic transports packets pertaining to a higher layer protocol, for example an IP protocol (layer 3).

Figure 4:
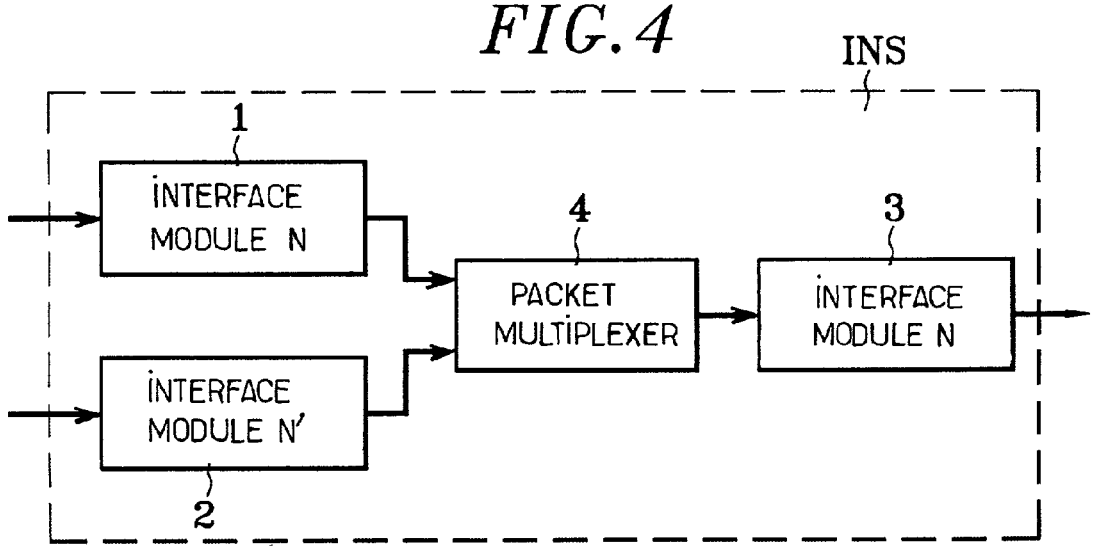
FIG. 4 is a schematic diagram of an insertion device according to the invention.

One possible embodiment of the insertion device INS takes the form shown in FIG. 4, and comprises the following elements:

an interface module 1 in accordance with the point-to-point interface N for the physical layer and the layer ensuring the delimiting of the packets, which is linked to the facility C1. This module 1 receives data units (segmented or concatenated IP packets) of the interface format N, and in a conventional manner recovers the packets transported;

an interface module 2 in accordance with an interface N' identical to or different from the interface N. This module 2 receives the traffic of the SDT in the form of data units of the interface format N' and in a conventional manner recovers the packets transported;

an interface module 3 in accordance with the same interface N as the module 1 and linked to the SET so as to send the latter the combined traffic emanating from C1 and SDT; and a packet multiplexer 4 ensuring the mixing of the packets originating from the modules 1 and 2, so as to deliver the stream of packets to be sent by the interface module 3. The multiplexer 4 is capable of ensuring the storage of one or more packets while another is sent to the module 3. It also ensures arbitration in the event of the simultaneous presence of a packet originating from the modules 1 and 2.

The packet multiplexer 4 can be configured to adopt various types of arbitration strategy depending on the requirements of the test performed, for example one of the following:

always give priority to the packet originating from module 1;

always give priority to the packet originating from module 2;

arbitrate equitably between the packets originating from interface modules 1 and 2;

arbitrate with weighting between the packets originating from interface modules 1 and 2, for example take N1 packets from module 1 for N2 packets from module 2, etc.

The identity of the point-to-point transmission standard N between the receiving module 1 and the sending module 3 allows transparent insertion of the additional traffic between two network facilities.

The receiving modules 1 and 2 delimit the packets without either seeking to understand or to process their content. Stated otherwise, they merely process the physical layer and the layer for delimiting the packets. It should be noted that there may be different types of interface for modules 1 and 2 (in the case where N≠N').

The control by the multiplexer 4 of the mixing of the streams of packets emanating from the receiving modules 1 and 2 carries out an unconditional steering of the packets received by way of the modules 1 and 2 to the interface module 3, that is to say independent of any configuration and of the content of the packets.

The interface modules 1, 2 and 3 can be standard commercial components. The multiplexer 4 can be embodied, for example, by means of a programmable logic circuit associated with a memory.

What is claimed is:

1. Process for testing switching system receiving data units according to a point-to-point transmission interface format originating from an external network facility, the data units transporting packets of a higher layer protocol, the process comprising the steps of:

processing first data units originating from the external network facility so as to recover first packets transported by the first data units;

generating test traffic carried by second packets of said higher layer protocol;

multiplexing the first and second packets so as to form a stream of multiplexed packets;

converting the stream of multiplexed packets into second data units according to said point-to-point transmission interface format; and transmitting the second data units to the switching system.

2. Process according to claim 1, wherein the generation of the test traffic comprises producing a stream of data units according to a interface format transporting said second packets; and processing said stream of data units so as to recover the second packets.

3. Process according to claim 2, wherein said specified interface format is distinct from said point-to-point transmission interface format.

4. Process according to claim 1, further comprising the step of setting states of the switching system by means of the first packets by way of the external network facility.

5. Process according to claim 1, wherein the switching system is linked to several external network facilities and states of the switching system are set by way of at least one of said external network facilities.

6. Process according to claim 1, wherein said higher layer protocol is an IP protocol.

7. Process according to claim 1, further comprising the step of performing an arbitration between the first and second packets before multiplexing.

8. Device for inserting traffic comprising first and second interface modules supporting a point-to-point transmission interface format for transferring data units transporting packets of a higher layer protocol, the first interface module being arranged to receive first data units originating from a network facility and the second interface module being arranged to send second data units to a switching system, the device further comprising multiplexing means for forming a stream of multiplexed packets comprising first packets recovered by the first interface module from the first data units and second packets of said higher layer protocol carrying additional traffic, the second data units being produced by the second interface module on the basis of the stream of multiplexed packets.

9. Device according to claim 8, further comprising a third interface for receiving a stream of data units according to a specified interface format originating from an external traffic source and recovering said second packets from said stream of data units.

10. Device according to claim 9, wherein said specified interface format is distinct from said point-to-point transmission interface format.

11. Device according to claim 8, incorporated into a traffic source generating the second packets carrying said additional traffic.

12. Device according to claim 8, wherein said higher layer protocol is an IP protocol.

* * * * *